(12) United States Patent
Elberson

(10) Patent No.: US 7,179,994 B2
(45) Date of Patent: Feb. 20, 2007

(54) LOW VOLTAGE ELECTRICAL BOX

(75) Inventor: Thomas L. Elberson, Defiance, OH (US)

(73) Assignee: Allied Moulded Products, Inc., Bryan, OH (US)

(*) Notice: Subject to any disclaimer, the term of this patent is extended or adjusted under 35 U.S.C. 154(b) by 0 days.

(21) Appl. No.: 11/371,684

(22) Filed: Mar. 8, 2006

(65) Prior Publication Data
US 2006/0201692 A1   Sep. 14, 2006

Related U.S. Application Data

(60) Provisional application No. 60/660,003, filed on Mar. 9, 2005.

(51) Int. Cl.
*H01H 9/02* (2006.01)

(52) U.S. Cl. .......................... 174/58; 174/50; 174/60; 174/64; 220/4.02; 439/535; 248/906

(58) Field of Classification Search .................. 174/50, 174/58, 60, 64, 17 R; 220/3.2, 4.02; 439/535; 248/906
See application file for complete search history.

(56) References Cited

U.S. PATENT DOCUMENTS

| | | | | |
|---|---|---|---|---|
| 2,730,261 | A | * | 1/1956 | Tutt .......................... 220/3.7 |
| D229,064 | S | * | 11/1973 | Powell ...................... D13/152 |
| 3,917,101 | A | * | 11/1975 | Ware ........................... 220/3.2 |
| 4,039,135 | A | | 8/1977 | Schenk |
| 4,557,445 | A | | 12/1985 | Ohara |
| 5,448,012 | A | * | 9/1995 | Jacob ........................... 174/48 |
| 5,545,848 | A | | 8/1996 | Lin |
| 6,066,803 | A | * | 5/2000 | Hagarty ....................... 174/50 |
| D427,889 | S | | 7/2000 | Gretz |
| 6,147,304 | A | | 11/2000 | Doherty |
| D436,836 | S | | 1/2001 | Erwin |
| 6,300,567 | B1 | | 10/2001 | Hayduke et al. |
| 6,376,770 | B1 | | 4/2002 | Hyde |
| D457,140 | S | | 5/2002 | Roesch et al. |
| D459,312 | S | | 6/2002 | Roesch et al. |
| D462,664 | S | | 9/2002 | Roesch et al. |
| D463,376 | S | | 9/2002 | Roesch et al. |
| 6,452,098 | B1 | | 9/2002 | Gretz |
| 6,452,813 | B1 | | 9/2002 | Gretz |
| 6,508,445 | B1 | | 1/2003 | Rohmer |
| 6,543,940 | B2 | | 4/2003 | Chu |
| 6,624,355 | B1 | | 9/2003 | Gretz |
| 6,710,245 | B2 | | 3/2004 | Roesch et al. |
| 6,727,428 | B2 | | 4/2004 | Archer et al. |
| 7,022,912 | B1 | * | 4/2006 | Kilburn ....................... 174/50 |
| 2002/0074143 | A1 | | 6/2002 | English |
| 2004/0074659 | A1 | | 4/2004 | Roesch et al. |
| 2004/0159456 | A1 | | 8/2004 | Archer et al. |
| 2005/0011661 | A1 | | 1/2005 | Herth |
| 2005/0011662 | A1 | | 1/2005 | Herth |

FOREIGN PATENT DOCUMENTS

DE   40 09 190 C1   9/1991

\* cited by examiner

*Primary Examiner*—Dhiru R. Patel
(74) *Attorney, Agent, or Firm*—Fraser Martin & Miller LLC; J. Douglas Miller

(57) ABSTRACT

An electrical box is disclosed for supporting and containing electrical devices and wiring including low voltage devices and wiring such as used for telephones, televisions, computers, and security systems, for example, wherein a rigidity of the box is maximized.

20 Claims, 5 Drawing Sheets

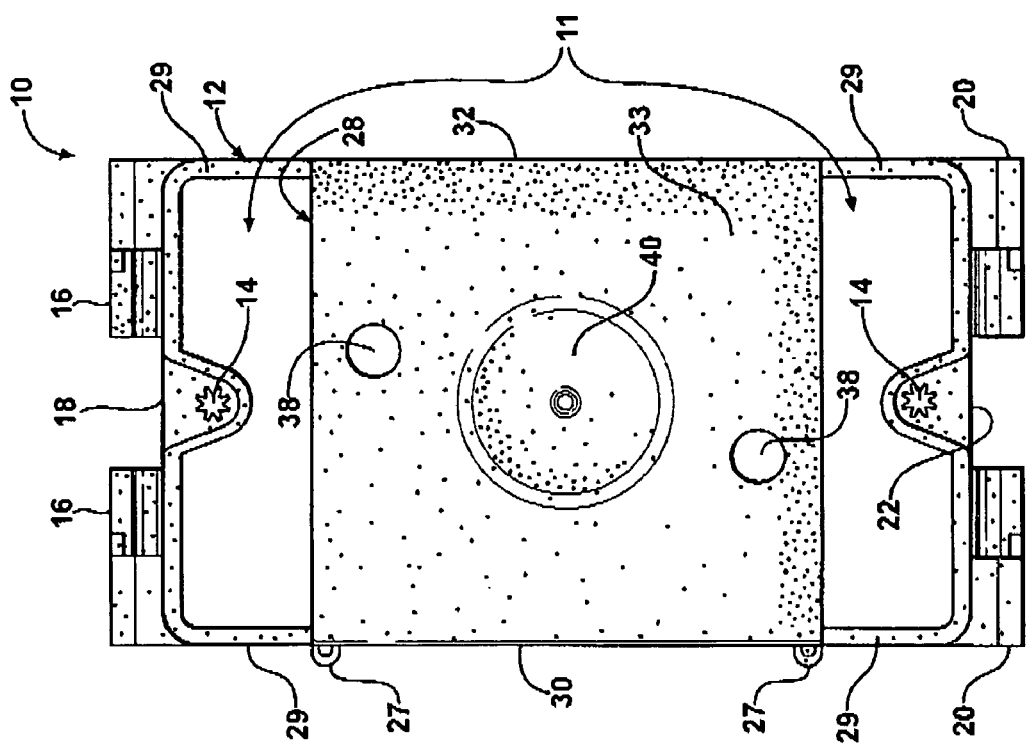
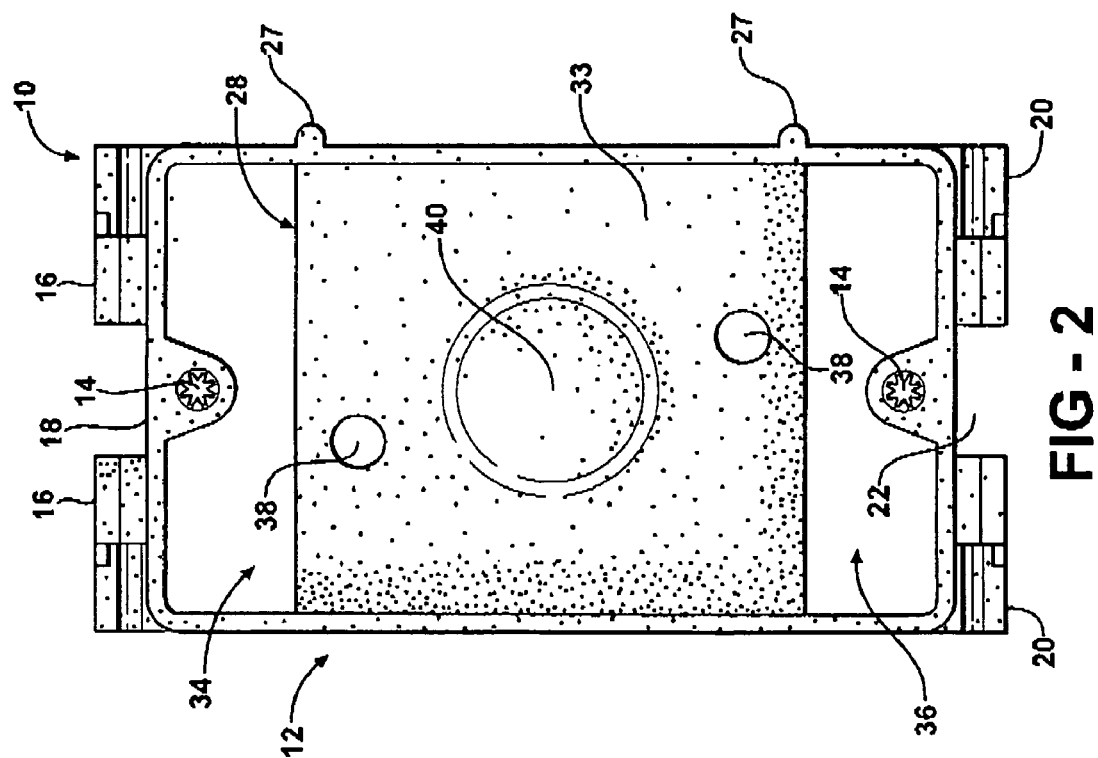

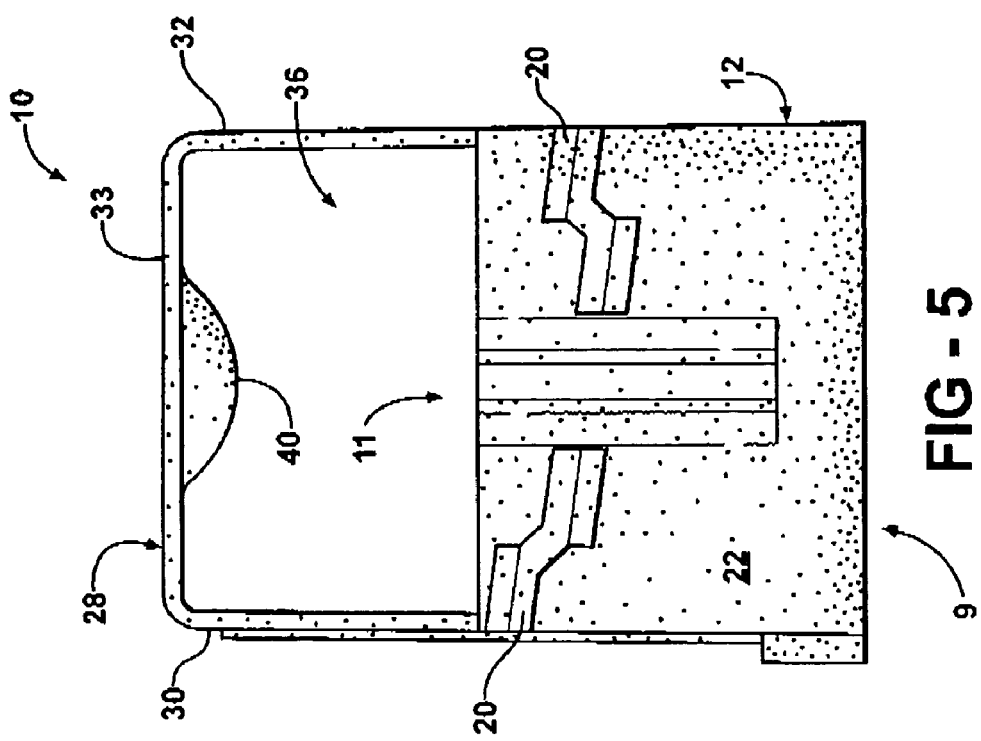
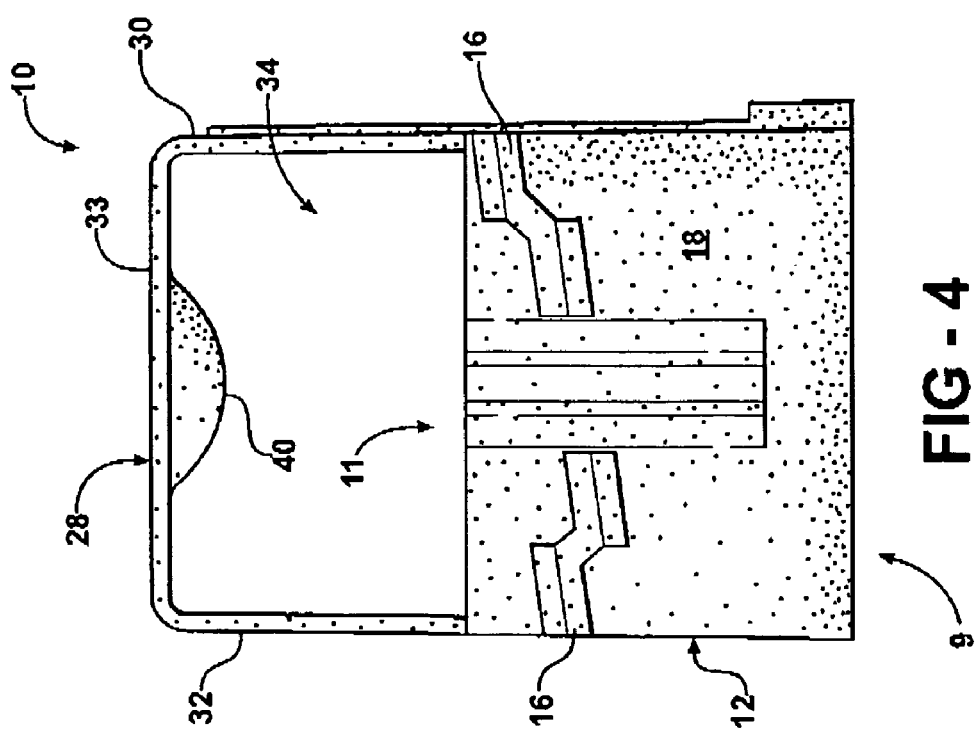

LOW VOLTAGE ELECTRICAL BOX

CROSS-REFERENCE TO RELATED APPLICATION

This application claims priority to U.S. Provisional Patent Application Ser. No. 60/660,003, filed Mar. 9, 2005, the entire disclosure of which is incorporated herein by reference.

FIELD OF THE INVENTION

The invention relates to an electrical box, and more particularly to an electrical box for supporting and containing electrical devices and wiring such as low voltage devices and wiring, for example

BACKGROUND OF THE INVENTION

Typically, an electrical box is used to support and contain electrical devices and wiring in a convenient manner. The electrical box protects the wiring and electrical devices contained therein. Additionally, the electrical box can be adapted to have a device attached thereto for receiving an electrical plug or coupling, for example. A cover plate is typically provided to further protect the wiring and electrical devices and militate against accidental electrocution of a user.

An electrical box for containing low voltage electrical devices and wiring has requirements different from and beyond those required for conventional electrical boxes. The wiring used for a low voltage system requires a larger bending radius than conventional wiring. Thus, larger openings or boxes without back portions have been used to facilitate the larger bending radius. However, these boxes lack desired rigidity and result in undesirable damage to the box and the contents thereof.

It would be desirable to produce an electrical box for supporting and containing electrical devices and wiring wherein a rigidity of the box is maximized.

SUMMARY OF THE INVENTION

Harmonious with the present invention, an electrical box for supporting and containing electrical devices and wiring wherein a rigidity of the box is maximized, has surprisingly been discovered.

In one embodiment, the electrical box comprises a hollow main body having an open front portion and an open rear portion, a rear edge of the main body surrounding the open rear portion; and a rear section extending rearwardly from the rear edge of the main body and having a hollow interior, an open front, a back wall, a first opening and a second opening.

In another embodiment, the electrical box comprises a hollow main body having a top panel, a bottom panel, a first side panel, a second side panel spaced apart from the first side panel, an open front portion and an open rear portion; and a rear section having a first wall extending rearwardly from the main body, a spaced apart second wall extending rearwardly from the main body, and a back wall disposed between the first wall and the second wall, wherein the first wall, the second wall, and the back wall cooperate with the main body to form a first opening and a second opening.

In another embodiment, an electrical box comprising a hollow main body having a top panel, a bottom panel, a first side panel, a second side panel, an open front portion, and an open rear portion, the top panel and the bottom panel adapted to receive at least one fastener, at least one of the first side panel and the second side panel including at least one rib formed thereon; and a rear section having a first wall extending rearwardly from the main body, a spaced apart second wall extending rearwardly from the main body, and a back wall disposed between the first wall and the second wall, wherein the first wall, the second wall, and the back wall cooperate with the main body to form a first opening and a second opening.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is a front elevational view of the electrical box illustrated in FIG. 1;

FIG. 3 is a rear elevational view of the electrical box illustrated in FIG. 1;

FIG. 4 a top plan view of the electrical box illustrated in FIG. 1;

FIG. 5 is a bottom plan view of the electrical box illustrated in FIG. 1;

DESCRIPTION OF THE PREFERRED EMBODIMENT

Figure 1:
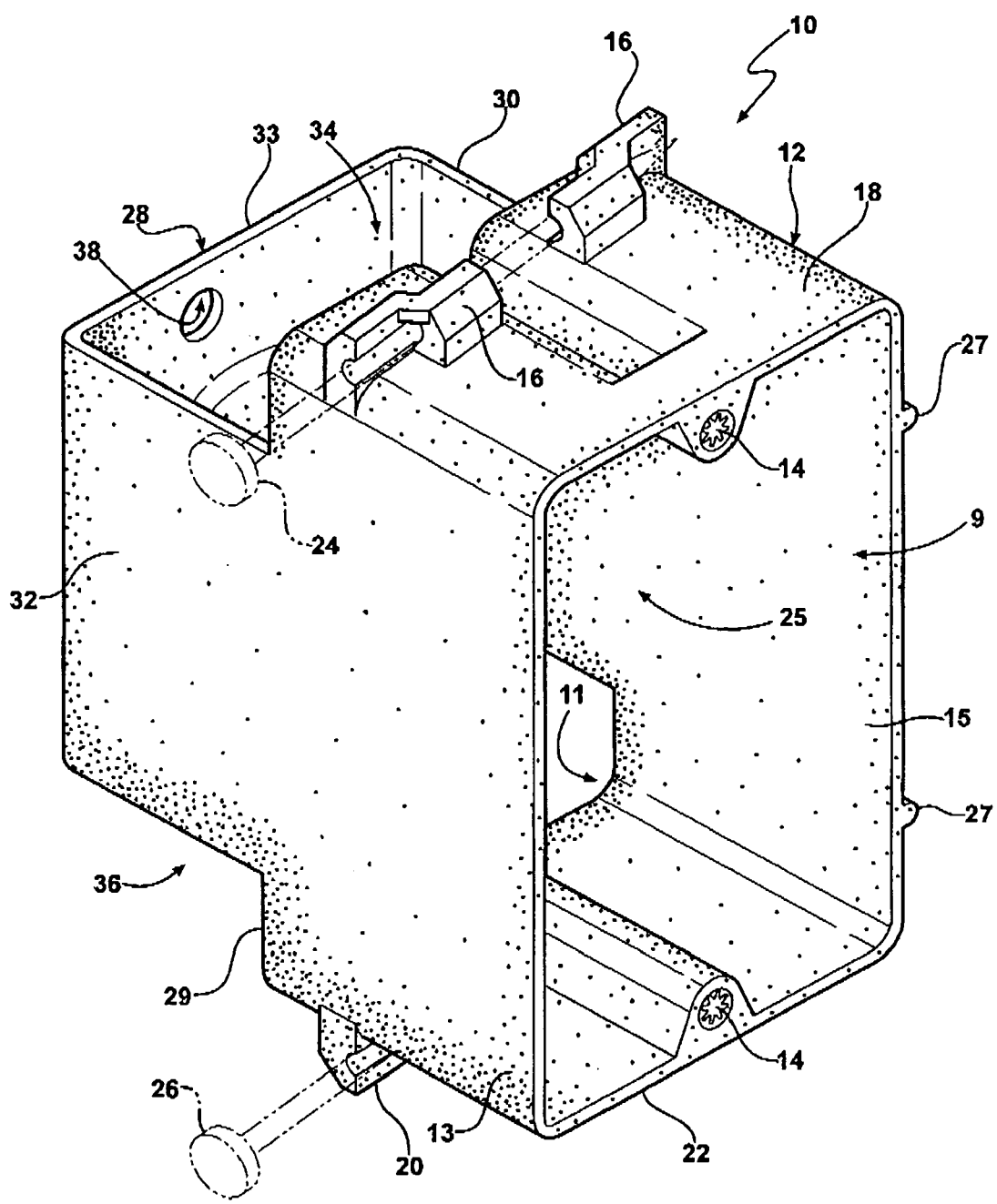
FIG. 1 is a perspective view of an electrical box according to an embodiment of the invention.
Figure 7:
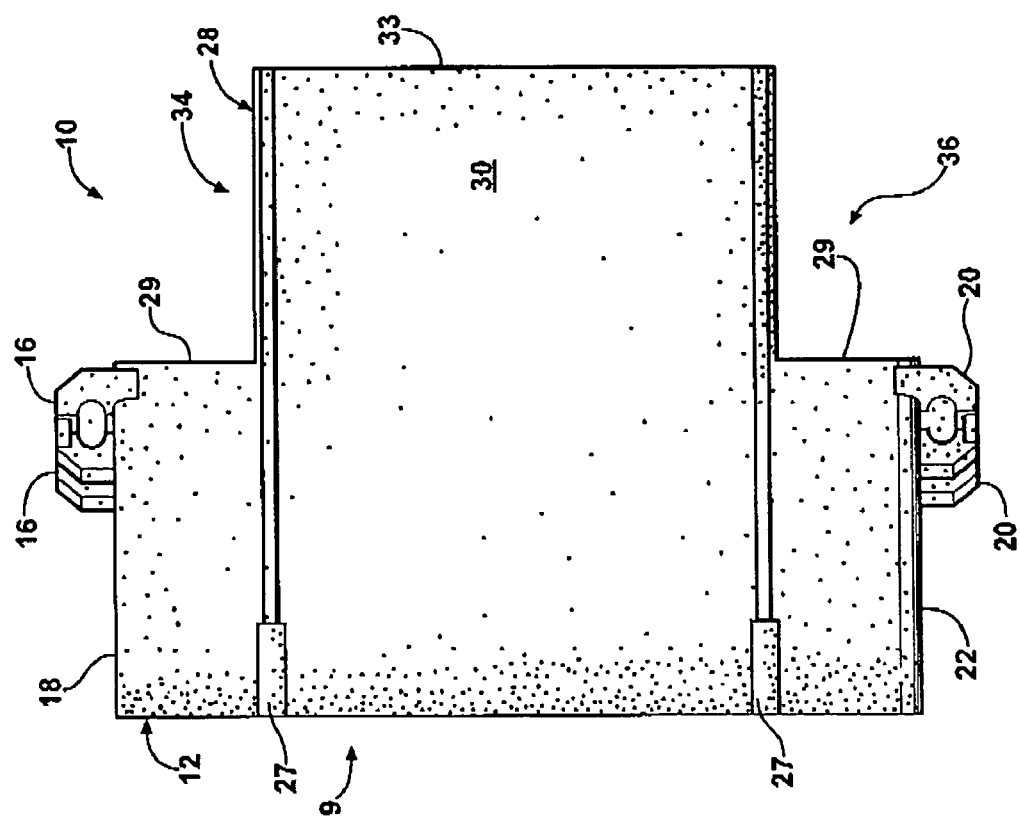
FIG. 7 is a right end elevational view of the electrical box illustrated in FIG. 1.
Figure 6:
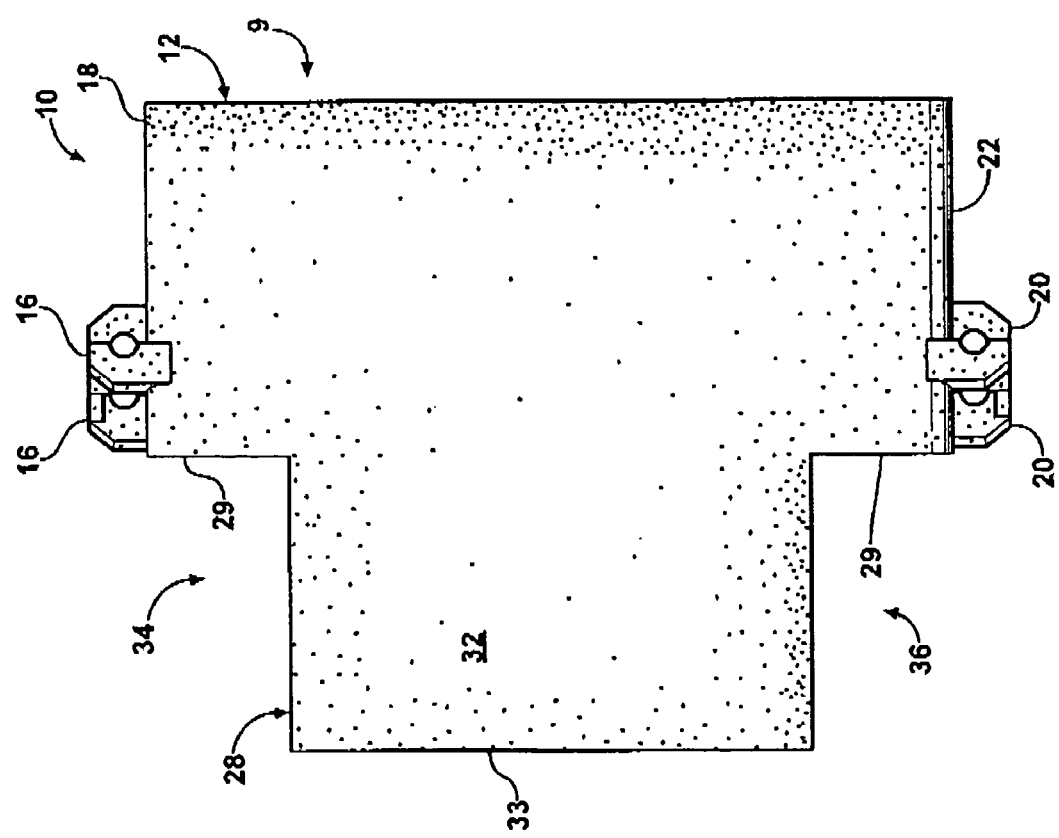
FIG. 6 is a left end elevational view of the electrical box illustrated in FIG. 1.

The following detailed description and appended drawings describe and illustrate various exemplary embodiments of the invention. The description and drawings serve to enable one skilled in the art to make and use the invention, and are not intended to limit the scope of the invention in any manner. FIG. 1 illustrates an electrical box 10 according to an embodiment of the invention. Surprisingly favorable results have been obtained using the electrical box 10 for low voltage applications for supporting and containing low voltage electrical devices and wiring such as those used for telephones, televisions, computers, and security systems, for example. The electrical box 10 includes a hollow main body 12 having an open front portion 9 and an open rear portions 11. In the embodiment shown, an outer wall of the main body 12 has a substantially rectangular cross section comprising a top panel 18, a bottom panel 22, a first side panel 13, and a second side panel 15. It is understood that other cross sectional shapes can be used as desired.

Figure 8:
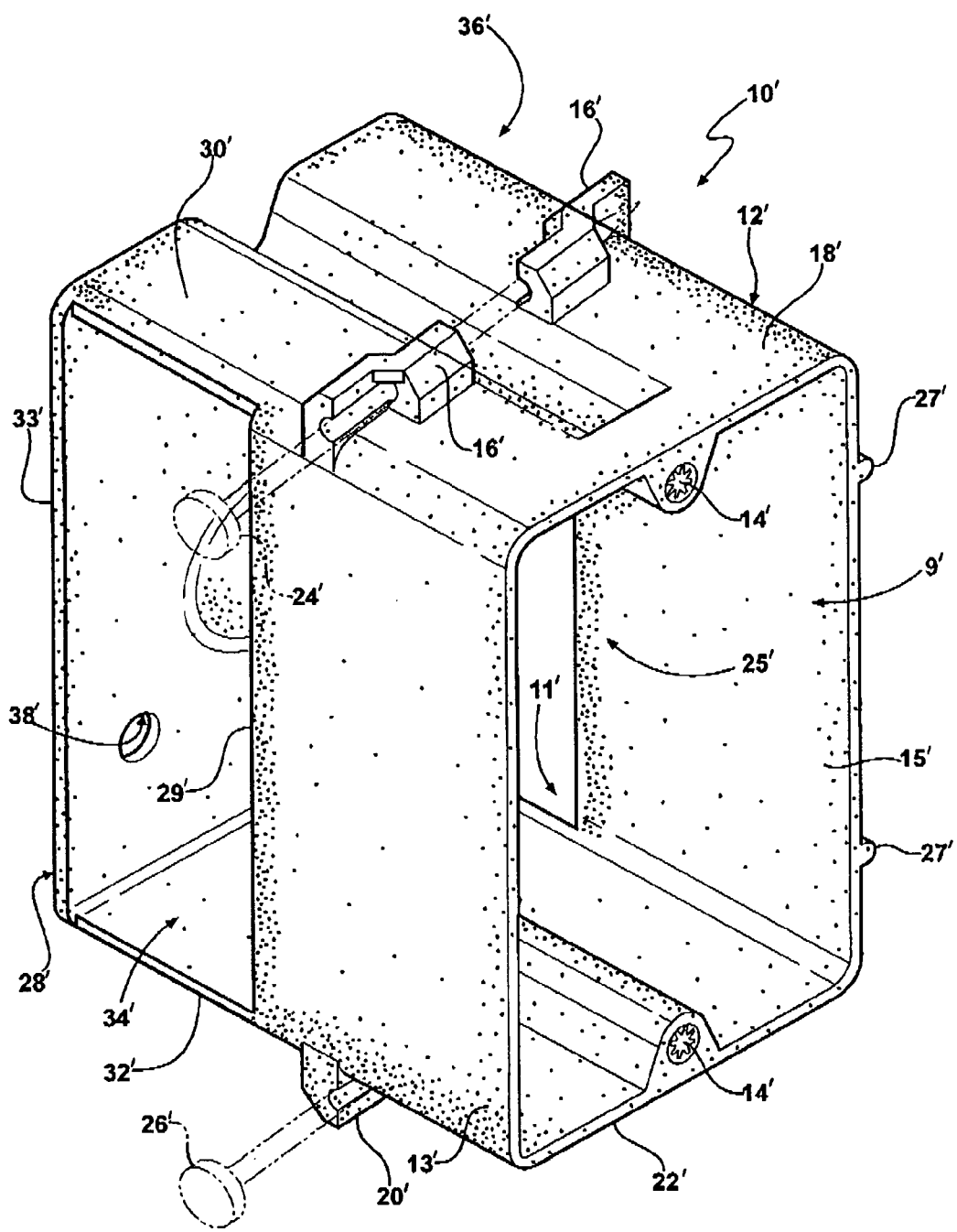
FIG. 8 is a perspective view for an electrical box according to another embodiment of the invention.

The main body 12 includes apertures 14 formed therein adjacent a front of the main body 12. Each of the apertures 14 is adapted to receive a threaded fastener therein (not shown) to attach a cover plate or other device (not shown), for example. The apertures may be formed at any location of the front of the main body 12 as desired. The main body 12 also includes a first pair of cooperating protuberances 16 formed on the top panel 18 and a second pair of cooperating protuberances 20 formed on the bottom panel 22 thereof as clearly shown in FIGS. 2, 3, and 5. The protuberances 16, 20 are adapted to receive a fastener 24, 26 respectively therein for attachment to a wood or metal stud or joist (not shown) of a building (not shown), for example. In the embodiment shown, the fasteners 24, 26 are nails, however, it is understood that other fasteners can be used such as threaded fasteners, for example. A rear section 28 having an open front 25 extends outwardly from a rear edge 29 of the rear portion of the main body 12. The rear section 28 is attached to the main body 12 by a pair of substantially parallel, spaced apart side walls 30, 32. In the embodiment shown, the side walls 30, 32 are shown extending rearwardly from the sides of the main body 12. However, it is understood that the side walls 30, 32 could extend rearwardly from the top panel 18 and the bottom panel 22 of the main body 12 without departing from the scope and spirit of the invention, as shown in FIG. 8. Similar structure from FIGS. 1–7 is illustrated in FIG. 8 with the same reference numerals and a prime symbol. A back wall 33 extends between the side walls 30, 32 at distal ends thereof. The rear section 28 and the main body 12 cooperate to form an open top 34 and an open bottom 36 therebetween. It is understood that an upper wall (not shown) having an aperture formed therein and a lower wall (not shown) having an aperture formed therein could be formed on the rear section 28 in place of the open top 34 and open bottom 36 without departing from the spirit or scope of the invention. In the embodiment where the side walls 30', 32' extend from the top panel 18' and the bottom panel 22' of the main body 12', the rear section 28' and the main body 12' cooperate to form a pair of open side portions 34',36'. It is understood that side walls (not shown) having an aperture formed therein could be fanned on the rear section 28 in place of the open side portions without departing from the spirit or scope of the invention. Knockout portions (not shown) formed in the main body 12 and the rear section 28 can be provided as desired.

Apertures 38 are formed in the back wall 33 of the rear section 28. It is understood that the apertures 38 can be formed in the side walls 30, 32 if desired. A protuberance 40 centrally disposed in the back wall 33 of the rear section 28 extends inwardly from the back wall 33 towards the main body 12 as clearly shown in FIGS. 4 and 5. Ribs 27 are disposed on an outer surface of the main body 12 and the rear section 28 to add rigidity to the electrical box 10 and facilitate alignment during installation. More or fewer ribs 27 can be used as desired.

In use, the electrical box 10 is installed on the stud or the joist using fasteners 24, 26. An end of wiring to be terminated or contained in the electrical box 10 can be attached to the rear section 28 by a wire fastener (not shown) such as a wire tie, for example, during installation of the electrical box 10. As defined herein, wiring includes electrical wires, cables; and the like, for example. The wiring enters the rear section 28 of the electrical box 10 through one of the top opening 34 and the bottom opening 36 as desired and the end thereof extends out of the other of the top opening 34 and the bottom opening 36 with the wire fastener connected to the electrical box 10 through one or more of the apertures 38. Additionally, by fastening the wiring to the electrical box 10 in this manner, the wiring is located away from the front of the main body 12 during installation of the electrical box 10 and the surrounding structure. Thus, when various installation operations are performed adjacent the front of the main body 12 such as using a router to cut an opening around the electrical box 10, for example, the wiring is protected against damage.

When it is desired to make final connections, the wire fastener can be removed to release the end of the wiring for termination or connection within the electrical box 10. The top opening 34 and the bottom opening 36 facilitate a large bending radius where the wiring enters the electrical box 10 for connection or termination, thereby militating against undesirable damage to the wiring.

In the embodiment shown, the electrical box 10 is produced by molding a plastic material as a unitary structure. It is understood that the electrical box 10 can be produced using other conventional production methods without departing from the scope and spirit of the invention. The electrical box 10 can also be produced as an assembly having a separate main body 12 and rear section 28, for example.

Due to the structural configuration of the electrical box 10, rigidity of the electrical box 10 is maximized. Additionally, the ribs 27 add rigidity to the electrical box 10.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical box comprising:
    a hollow main body having an open front portion and an open rear portion, a rear edge of said main body surrounding the open rear portion; and
    a rear section extending rearwardly from the rear edge of said main body and having a hollow interior, an open front, a back wall, wherein said rear section cooperates with said main body to form at least one of a substantially open top portion, a substantially open bottom portion, and a substantially open side portion.

2. The electrical box according to claim 1 wherein said main body includes a top panel, a bottom panel, a first side panel, and a second side panel spaced apart from the first side panel.

3. The electrical box according to claim 2 wherein said main body has a rectangular cross section.

4. The electrical box according to claim 3 wherein the first side panel and the second side panel of said main body are substantially parallel.

5. The electrical box according to claim 2 wherein the top panel and the bottom panel of said main body include at least one aperture formed therein to receive a fastener therein to attach at least one of a device and a cover plate to the electrical box.

6. The electrical box according to claim 2 wherein the top panel and the bottom panel of said main body include at least one protuberance formed thereon, the at least one protuberance having an aperture formed therein adapted to receive a fastener.

7. The electrical box according to claim 2 wherein at least one of the first side panel and the second side panel include at least one rib formed thereon.

8. The electrical box according to claim 7 wherein the rib extends from a front of the at least one of the first side panel and the second side panel to a back of the at least one of the first side panel and the second side panel.

9. The electrical box according to claim 1 wherein said rear section includes a first wall extending rearwardly from the rear edge of said main body and a spaced apart second wall extending rearwardly from the rear edge of said main body.

10. The electrical box according to claim 9 wherein the first wall of said rear section extends rearwardly from the first side panel of said main body and the second wall extends rearwardly from the second side panel of said main body.

11. The electrical box according to claim 9 wherein the first wall of said rear section extends rearwardly from the top panel of said main body and the second wall of said rear section extends rearwardly from the bottom panel of said main body.

12. The electrical box according to claim 1 wherein said rear section cooperates with said main body to form a second one of a substantially open top portion, a substantially open bottom portion, and a substantially open side portion.

13. The electrical box according to claim 1 wherein said main body and said rear section are formed as an integral unit.

14. The electrical box according to claim 1 wherein said main body is formed separately from said rear section.

15. An electrical box comprising:
   a hollow main body having a top panel, a bottom panel, a first side panel, a second side panel spaced apart from the first side panel, an open front portion and an open rear portion; and
   a rear section having a first wall extending rearwardly from said main body, a spaced apart second wall extending rearwardly from said main body, and a back wall disposed between the first wall and the second wall, wherein the first wall, the second wall, and the back wall cooperate with said main body to form at least two of a substantially open top portion, a substantially open bottom portion, a substantially open first side portion, and a substantially open second side portion.

16. The electrical box according to claim 15 wherein said main body and said rear section are formed as an integral unit.

17. The electrical box according to claim 15 wherein said main body is formed separately from said rear section.

18. The electrical box according to claim 17 wherein the first wall of said rear section extends rearwardly from the first side panel of said main body and the second wall extends rearwardly from the second side panel of said main body.

19. The electrical box according to claim 17 wherein the first wall of said rear section extends rearwardly from the top panel of said main body and the second wall of said rear section extends rearwardly from the bottom panel of said main body.

20. An electrical box comprising:
   a hollow main body having a top panel, a bottom panel, a first side panel, a second side panel, an open front portion, and an open rear portion, the top panel and the bottom panel adapted to receive at least one fastener, at least one of the first side panel and the second side panel including at least one rib formed thereon; and
   a rear section having a first wall extending rearwardly from said main body, a spaced apart second wall extending rearwardly from said main body, and a back wall disposed between the first wall and the second wall, wherein said rear section cooperates with said main body to form at least one of a substantially open top portion, a substantially open bottom portion, and a substantially open side portion.

* * * * *

UNITED STATES PATENT AND TRADEMARK OFFICE
CERTIFICATE OF CORRECTION

PATENT NO. : 7,179,994 B2 Page 1 of 1
APPLICATION NO. : 11/371684
DATED : February 20, 2007
INVENTOR(S) : Thomas L. Elberson It is certified that error appears in the above-identified patent and that said Letters Patent is hereby corrected as shown below:

At column 2, line 44, after the phrase "invention in any manner." a new paragraph should begin, starting with the phrase "FIG. 1 illustrates...."

At column 3, line 5, after the phrase "such as threaded fasteners, for example." a new paragraph should begin, starting with the phrase "A rear section 28...."

At column 3, lines 12 and 29; column 4, line 65; and column 5, line 24; the term "waIl" or "waiI" should be changed to the term --wall.--

At column 3, line 17, the phrase "a prime symbol" should be replaced with the phrase --a prime (′) symbol.--

Signed and Sealed this

First Day of May, 2007

JON W. DUDAS
*Director of the United States Patent and Trademark Office*